United States Patent [19]

McRoberts et al.

[11] Patent Number: 5,663,961

[45] Date of Patent: Sep. 2, 1997

[54] PACKET SWITCH WITH CENTRALIZED BUFFERING FOR MANY OUTPUT CHANNELS

[75] Inventors: Louis Albert McRoberts, deceased, late of Scottsdale, by Nancy A. McRoberts, executor; Kenneth Wayne Hines; Karl Eric Miller, both of Tempe; Gary James Lang, Gilbert, all of Ariz.

[73] Assignee: Motorola, Inc., Schaumburg, Ill.

[21] Appl. No.: 393,787

[22] Filed: Feb. 24, 1995

[51] Int. Cl.⁶ .................................................. H04L 12/56
[52] U.S. Cl. ........................ 370/412; 370/423; 370/433
[58] Field of Search ................. 370/60, 60.1, 94.1, 370/94.2, 85 B, 353, 356, 359, 360, 362, 363, 374–376, 389, 392, 394, 395, 398, 400, 412, 413–419, 423, 428, 429, 433, 437, 459, 380, 427, 411, 424, 434; 395/200, 250, 325, 400, 425, 500, 725, 375, 275, 575, 600, 650, 700, 750, 800, 164, 204, 858, 868, 867, 872, 877, 842, 840, 841; 364/134, 200, 942.08

[56] References Cited

U.S. PATENT DOCUMENTS

| | | | |
|---|---|---|---|
| 4,742,446 | 5/1988 | Morioka et al. | 395/250 |
| 4,875,206 | 10/1989 | Nichols et al. | 370/85.15 |
| 4,972,315 | 11/1990 | Yamasaki et al. | 395/400 |
| 5,001,627 | 3/1991 | Sakamoto | 395/375 |
| 5,023,776 | 6/1991 | Gregor | 395/425 |
| 5,402,426 | 3/1995 | Foglae et al. | 370/60 |
| 5,406,548 | 4/1995 | Itoh et al. | 370/60 |

*Primary Examiner*—Dang Ton
*Attorney, Agent, or Firm*—Frank J. Bogacz

[57] ABSTRACT

A communication network (10) includes packet switching nodes (18) in which packets from high speed data links (20, 22) are switched onto a multiplicity of low speed data links (26). Each node (18) includes a bulk RAM (30) which has a section (32) dedicated to implementing a multiplicity of logically independent FIFO buffers. A routing controller (46) controls DMA transfers of packets into and out from appropriate FIFO buffers. Packets are transferred into respective FIFO buffers consecutively and transferred out from respective FIFO buffers interleaved together.

14 Claims, 6 Drawing Sheets

| BANK ADDRESS (15 BITS) | TS # (2 BITS) | IBN # (2 BITS) | SUDL INTERFACE # (2 BITS) | CHANNEL # (5 BITS) | WORD COUNT (4 BITS) | 0 0 (2 BITS) |

*FIG. 6*

| BANK ADDRESS (15 BITS) | TS # (2 BITS) | OBN # (2 BITS) | SUDL INTERFACE # (2 BITS) | CHANNEL # (5 BITS) | WORD COUNT (4 BITS) | 0 0 (2 BITS) |

PACKET SWITCH WITH CENTRALIZED BUFFERING FOR MANY OUTPUT CHANNELS

TECHNICAL FIELD OF THE INVENTION

The present invention relates generally to the routing of data packets through a communications switch. More specifically, the present invention relates to a packet switch which uses centralized packet buffering for a multiplicity of parallel output channels.

BACKGROUND OF THE INVENTION

A data communication network may have different communication links with different capacity and other characteristics interconnected by switching nodes. Data may be grouped together into individual packets for delivery over various links between an origination node and a destination node. Each packet may include payload data along with control information, such as routing and error control. A complete communication session between origination and destination nodes may involve the transfer of any number of packets in a packet stream. The origination node and any number of intermediate nodes route the packets which make up the packet stream to the intended destination.

In some networks the physical route traversed by packets may change over the course of a communication session. In these and other situations, either a gap may appear in the packet stream flowing through a switching node, multiple packets may arrive at the switching node simultaneously, or a gap may be preceded or followed by multiple packets. This irregular packet stream flow poses problems when the route over which packets depart a network switching node includes a communication link operated at or near its maximum capacity because excess capacity is unavailable to handle the multiple packet situation.

First-in-first-out (FIFO) buffer memories may be included upstream from communication links operated at or near maximum capacity to temporarily store packets, smooth any irregular packet stream flow, and permit the communication links to efficiently operate at or near maximum capacity. Unfortunately, the use of conventional FIFO buffer memories is not a satisfactory solution when the switching node drives many parallel output channels each of which may operate at or near its maximum capacity. Implementing numerous conventional independent FIFO buffers for numerous channels is particularly inefficient. For example, a large number of gates is required to implement a single FIFO buffer in a conventional application specific integrated circuit (ASIC). When this large number is multiplied by the number of bits per packet, by the number of packets which need to be buffered, and by the number of channels which are operated in parallel, the resulting number of gates is exorbitant because it increases power, physical space, and expense requirements to undesirably high levels while diminishing reliability.

SUMMARY OF THE INVENTION

Accordingly, it is an advantage of the present invention that an improved packet switching apparatus and method are provided.

Another advantage is that the present invention provides a centralized memory in which a multiplicity of independent FIFO buffers are implemented.

Another advantage is that the present invention allows a packet for a given communication link to be written into a FIFO buffer in the centralized memory at a fast data transfer rate but removed from the buffer at a slower rate which more closely matches the maximum data transfer rate of the communication link.

The above and other advantages of the present invention are carried out in one form by a packet switching apparatus for switching a stream of received packets onward through a multiplicity of output channels. The apparatus includes a central memory configured to implement a multiplicity of independent packet buffers. A multiplicity of output channel drivers couple to the central memory. A routing controller also couples to the central memory. The routing controller directs the received packets into the central memory and out from the central memory to the output channel drivers.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
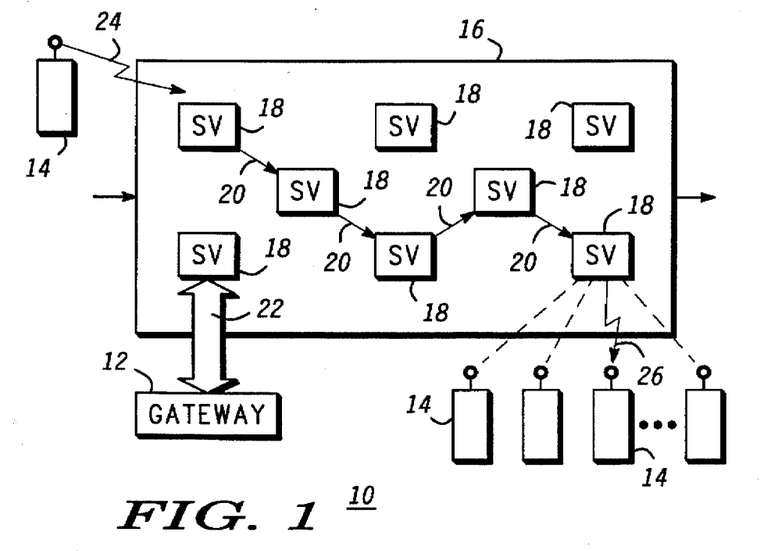
FIG. 1 shows a block diagram of a communication network in which the present invention may be practiced.

FIG. 1 shows a block diagram of a communication network 10. In the preferred embodiments, network 10 includes any number of gateways 12, each of which couples to any number of telephonic devices, such as conventional telephone instruments, facsimile machines, modems, and the like through a public switched telecommunications network (not shown). Likewise, network 10 includes any number, potentially but not necessarily in the millions, of subscriber units 14. Gateways 12 and subscriber units 14 use RF communications to communicate digital data packets among one another through a constellation 16 of packet switching nodes 18. In the preferred embodiments, the vast majority of subscriber units 14 are intended to be mobile units which may freely move anywhere on or near the surface of the earth and which may support one call at a time. Gateways 12 are also located on or near the surface of the earth, but they may simultaneously support a multiplicity of independent calls.

Constellation 16 includes any number of packet switching nodes 18. Each switching node 18 resides in a satellite vehicle (SV). In the preferred embodiment, 66 of these satellites are distributed in low earth, polar orbits to provide coverage over substantially the entire surface of the earth. However, for the sake of clarity FIG. 1 illustrates an example constellation 16 which includes only eight satellites.

Due to the low-earth orbits, switching nodes 18 move relative to the earth at speeds of around 25,000 Km/Hr. Gateways 12 and subscriber units 14, which may reside anywhere on the earth, communicate packets directly with the switching node 18 that is overhead at the moment the communications take place. However, due to the speed at which switching nodes 18 move, the switching node which supports a given earth-bound link changes from moment to moment.

When these changes occur, ongoing calls are handed off among the switching nodes 18. This handing off of calls and other network events may cause an irregular flow in a stream of packets being delivered to a subscriber unit 14. The irregular flow may be characterized by an unusually long duration or gap between the arrival of successive packets at the switching node 18 most directly communicating with the subscriber unit 14, by multiple packets arriving together, or by a gap preceded or followed by multiple packets.

In the preferred embodiments, each switching node 18 supports a variety of communication links. Cross links 20 couple switching nodes 18 to their neighbor switching nodes 18. In the preferred embodiments, each switching node 18 supports up to four cross links 20, but FIG. 1 illustrates only a few of cross links 20 for clarity. Bulk up/down links 22 couple switching nodes 18 to gateways 12. Each switching node 18 supports a few of links 22, but FIG. 1 shows only one link 22 for clarity. Each of links 20 and 22 provide high data rate, bi-directional communication paths which may simultaneously convey a multiplicity of ongoing calls, where each call is associated with its own stream of packets.

Each switching node 18 additionally supports a multiplicity of subscriber unit up links 24 and subscriber unit down links 26, but FIG. 1 shows only one each of links 24 and 26 for clarity. In one preferred embodiment, each subscriber unit 14 supports a single up link 24 and a single down link 26. Generally, links 24 and 26 are established only to subscriber units 14 engaged in calls. A few links 24 and 26 are dedicated to system functions which allow otherwise inactive subscriber units 14 to receive incoming page messages and to transmit outgoing initial acquisition messages. Compared to links 20 and 22 the vast majority of subscriber unit links 24 and 26 are low data rate communication paths which convey only a single call at a time.

Links 20, 22, 24, and 26 are desirably operated at or near their maximum capacities to efficiently utilize the portions of the RF spectrum which are assigned thereto. With respect to low data rate subscriber unit down links 26, irregular flows in the stream of packets being pulled off high data rate links 22 and 20 at switching nodes 18 for delivery over links 26 are desirably smoothed to prevent a multiple simultaneous packet arrival situation from causing dropped packets. In one preferred embodiment, FIFO buffers which can store at least three packets should be able to adequately perform this smoothing of irregular packet flows. However, in this same embodiment, each switching node 18 supports thousands of physically independent, parallel subscriber unit down links 26, up to 2048 in a preferred embodiment. Consequently, 2048 logically independent FIFO buffers are required for this embodiment.

Figure 2:
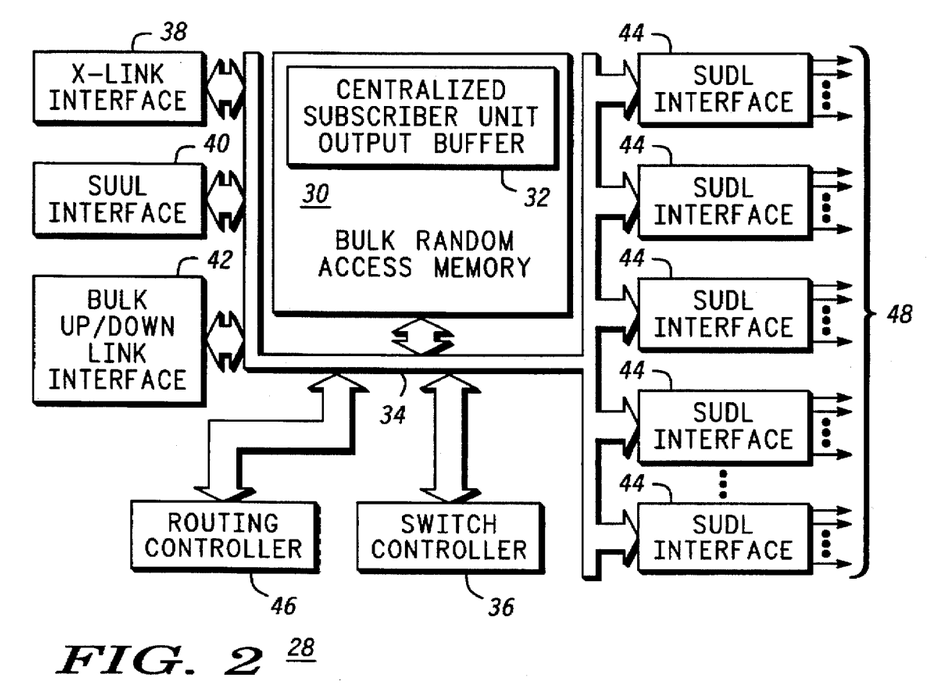
FIG. 2 shows a block diagram of a packet switching node configured in accordance with teaching of the present invention.

FIG. 2 shows a block diagram of an antenna computer 28 portion of a packet switching node 18. Each switching node 18 desirably includes antenna computers 28 similar to that shown in FIG. 2. Antenna computer 28 supports up to 512 subscriber unit down links (SUDLs) 26 in a preferred embodiment of the present invention. Multiple antenna computers 28, four in a preferred embodiment, may couple together to provide support for thousands of SUDLs 26, 2048 in a preferred embodiment. Consequently, antenna computer 28 incorporates 512 logically independent FIFO buffers to smooth out timing irregularities in packet streams flowing out of switching node 18 over SUDLs 26. This multiplicity of logically independent FIFO buffers is implemented in a centralized bulk random access memory (RAM) 30. In particular, these buffers are implemented together in a centralized subscriber unit output buffer portion 32 of RAM 30. Individual physically discrete FIFO memories are not distributed and implemented separately among output channel drivers to reduce power, physical space, and expense requirements while improving reliability.

RAM 30 couples to an address, data, and control bus 34, and a switch controller 36 couples to bus 34. Switch controller 36 is a programmed computer which manages the operation of antenna computer 28. Switch controller 36 additionally couples to other switch controllers 36 (not shown) in other antenna computers 28 within switching node 18 to coordinate the management of switching node 18.

Switch controller 36 accesses RAM 30 through bus 34 in a conventional manner. However, switch controller 36 is configured to refrain from accessing centralized subscriber unit output buffer 32 because switch controller 36 does not exert a direct influence over packets flowing out from switching node 18 over SUDLs 26. Rather, centralized subscriber unit output buffer 32 is located in RAM 30 within the address space of switch controller 36 to take advantage of the power consumption, physical space, and expense efficiencies achievable by bulk RAM.

Various link interfaces also couple to bus 34. For example, cross-link interfaces 38, subscriber unit up link (SUUL) interfaces 40, and bulk up/down link interfaces 42 couple to bus 34. FIG. 2 shows only one each of interfaces 38, 40, and 42 for clarity. Interfaces 38, 40, and 42 support links 20, 24, and 22 (see FIG. 1), respectively. Those skilled in the art will appreciate that various types of buffering may be utilized in connection with interfaces 38, 40, and 42, and this buffering may be located in RAM 30 or elsewhere. FIG. 2 omits illustrating such buffering for clarity. In addition, any number of SUDL interfaces 44 couple to bus 34 to drive subscriber unit down links 26 (see FIG. 1).

Likewise, a routing controller 46 couples to bus 34 to direct packets into and out from subscriber unit output buffer 32 by direct memory access (DMA) transfer. Routing controller 46 is discussed in more detail below in connection with FIGS. 4–9. Accordingly, bus 34 and RAM 30 are shared among a variety of functions. In the preferred embodiment, all non-switch controller 36 accesses of bus 34 utilize less than 30% of the capacity of bus 34, leaving over 70% of the bus capacity for switch controller 36. Less than 5% of the capacity of bus 34 is consumed by routing packets through switching node 18 outward over SUDL output channels 48 and SUDL links 26.

In the preferred embodiment, each SUDL interface 44 includes individual drivers for up to 32 SUDL output channels 48. Thus, four SUDL interfaces 44 are included to drive 128 output channels, and these 128 output channels are time-multiplexed by dividing network timing frames into four time slots to achieve a total of 512 independent output channels. Desirably, each SUDL interface 44 is incorporated in an application specific integrated circuit (ASIC), and all SUDL interfaces 44 are substantially identical to one another.

Each output channel incorporated in an SUDL interface 44 may include a small amount of buffering (not shown). For example, each output channel may have a latch capable of receiving a single 32-bit word and a 32-bit shift register having a parallel input coupled to an output of the 32-bit latch. Accordingly, a 32-bit word may be transferred into the 32-bit latch from bus 34 relatively a synchronously, then transferred into the 32-bit shift register and serially shifted out from the shift register in synchronism with transmission timing. This small amount of buffering stores only a fraction of an entire packet and far less than the multiple packets of buffering which are needed to smooth out packet flow irregularities.

Figure 3:
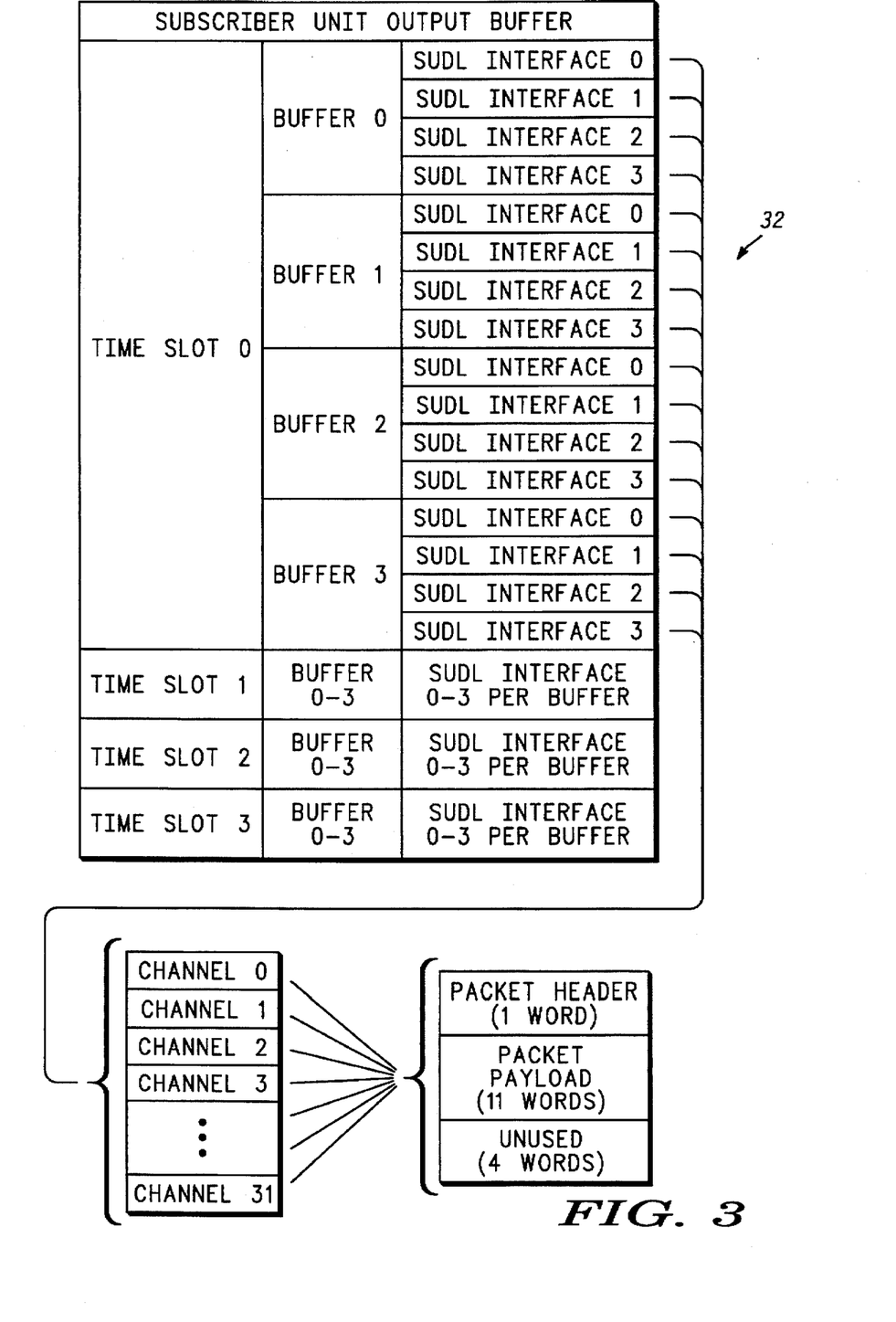
FIG. 3 shows an exemplary block diagram of a centralized subscriber unit output buffer in which a multiplicity of independent FIFO buffers are implemented.

FIG. 3 shows an exemplary block diagram of a memory structure usable in centralized subscriber unit output buffer 32. The example depicted in FIG. 3 applies to the preferred embodiment, in which 128 simultaneous SUDL output channels 48 are supported in each of four different time slots for a total of 512 SUDL output channels 48. Buffering is provided for up to four packets for each of the 512 SUDL output channels 48. The SUDL output channels 48 may be grouped together into blocks of 32 channels, where each block of 32 channels is associated with a particular SUDL interface 44 (see FIG. 2).

As discussed above, in the preferred embodiment only three packets should be needed for each of the SUDL output channels 48. Thus, providing buffering for four packets for each SUDL output channel 48 may be a less than optimum or otherwise inefficient use of memory due to the provision of buffering which may not be needed. However, since buffer 32 is implemented in bulk RAM 30 (see FIG. 2), this inefficient use of memory has a negligible impact, and deeper buffering leads to a more robust design. Moreover, management of four packets of buffering per SUDL output channel 48 leads to efficiencies, discussed below, in routing controller 46.

Each packet includes twelve 32-bit words. However, 16 words of buffer space are desirably allocated within buffer 32 for each packet, leaving four words of buffer space unused for each packet. The allocated amount of buffer space represents the smallest integer power of two which is larger than the length of a packet. This amount of allocated buffer space also leads to a less than optimum or inefficient use of memory due to the unused words associated with each packet. However, since buffer 32 is implemented in bulk RAM 30 (see FIG. 2), this inefficient use of memory again has a negligible impact. Moreover, the allocation of buffer lengths equal to integer powers of two leads to efficiencies within routing controller 46 (see FIG. 2).

Those skilled in the art will appreciate that the above discussed quantities and values describe only a single example configuration and that substantially similar and equivalent packet switches and packet switching methods may utilize vastly different values.

Figure 4:
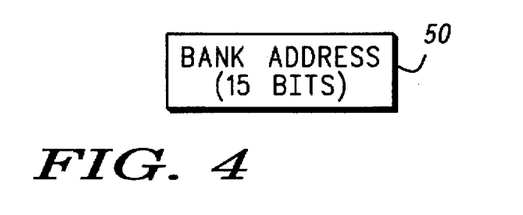
FIG. 4 shows a block diagram of a bank address register maintained in a routing controller of the packet switching node.

FIG. 4 shows a block diagram of a bank address register 50 maintained in routing controller 46 (see FIG. 2). Referring to FIGS. 2 and 4, routing controller 46 serves as an intelligent DMA controller which, among other tasks, forms addresses for bus 34. In the preferred embodiments, bus 34 supports 32-bit addressing and subscriber unit output buffer 32 requires $2^{17}$ or 131,072 (128K) bytes of memory. Thus, in order to access buffer 32 routing controller 46 specifies the "page" on which buffer 32 resides. Bank address register 50 stores the 15 bits of addressing that specifies the memory page at which buffer 32 may be found. Routing controller 46 desirably includes only the single bank address register 50 for all of the multiplicity of logically independent FIFO packet buffers managed by routing controller 46. The value set in register 50 may be provided through a write operation from switch controller 36.

Figure 5:
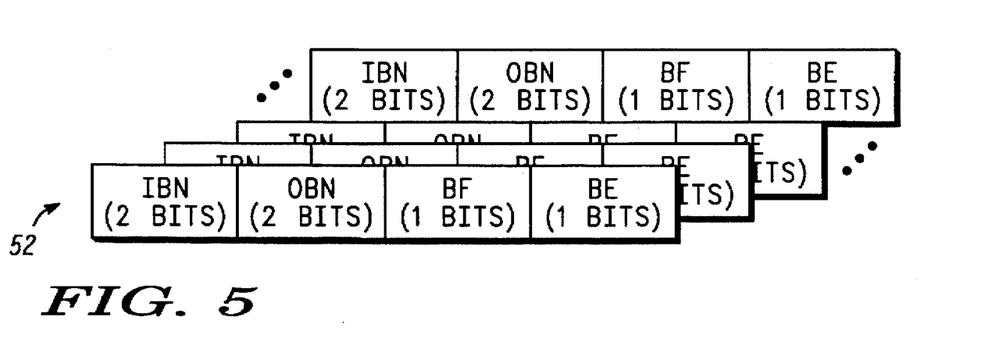
FIG. 5 shows a block diagram of a bank of condensed control registers maintained in the routing controller.

FIG. 5 shows a block diagram of a bank of condensed control registers 52 maintained in routing controller 46. One condensed control register 52 is maintained for each of the multiplicity of logically independent FIFO packet buffers managed by routing controller 46. In addition, each condensed control register is associated with a unique SUDL output channel 48. Thus, in the preferred embodiment routing controller 46 has 512 condensed control registers 52. However, each control register 52 is condensed so that it requires only six bits to manage its associated packet buffer.

In particular, each condensed control register 52 includes a 2-bit field for storing an input buffer number (IBN), a 2-bit field for storing an output buffer number (OBN), a 1-bit field for storing a buffer full (BF) flag, and a 1-bit field for storing a buffer empty (BE) flag. The buffer empty flag (BE) is set to indicate that the associated packet buffer is storing no valid packets. The input buffer number (IBN) carries a value of 0–3 to identify which of the four buffers allocated to the corresponding SUDL output channel 48 may be used to store the next incoming packet. The output buffer number (OBN) carries a value of 0–3 to identify which of the four buffers allocated to the corresponding SUDL output channel 48 should be used to provide the next outgoing packet. The buffer full (BF) flag is set when all four buffers allocated to the corresponding SUDL output channel 48 contain valid packets. In the preferred embodiment, the buffer empty (BE) flags from all condensed control registers 52 are provided through appropriate interface circuits read by switch controller 36.

Since a condensed control register 52 is provided for each SUDL output channel 48, a multiplicity of registers 52 are required. However, the amount of storage provided in these registers is very small when compared to the size of centralized subscriber unit output buffer 32. In fact, $2^N$, where N equals the number of bits included in each condensed control register 52, is substantially smaller than or equal to the number of bits in a single packet. The number of bits required for the entire bank of condensed control registers is sufficiently small that routing controller 46 is implemented in an ASIC in the preferred embodiment.

Figure 6:
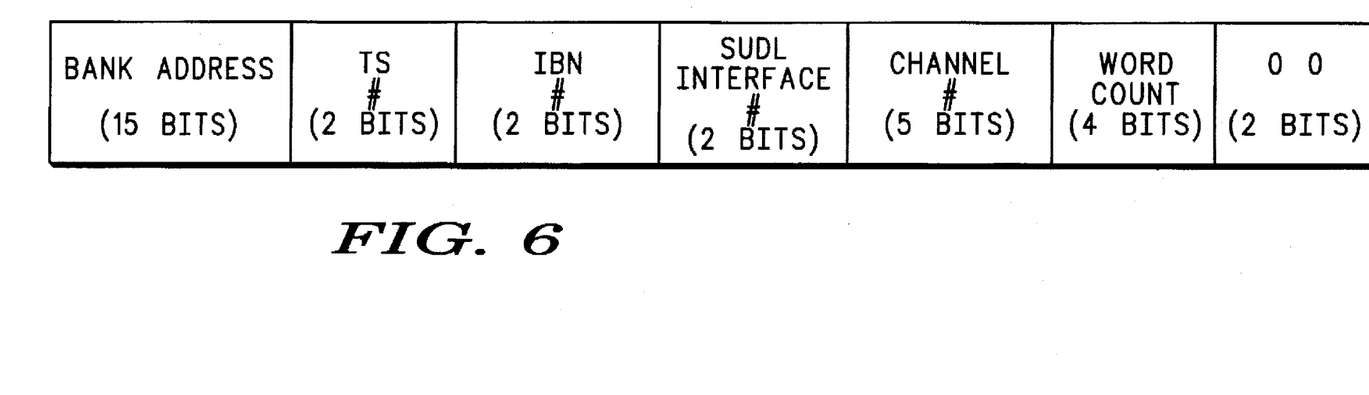
FIG. 6 shows a data format diagram of an input address formed by the routing controller.
Figure 7:
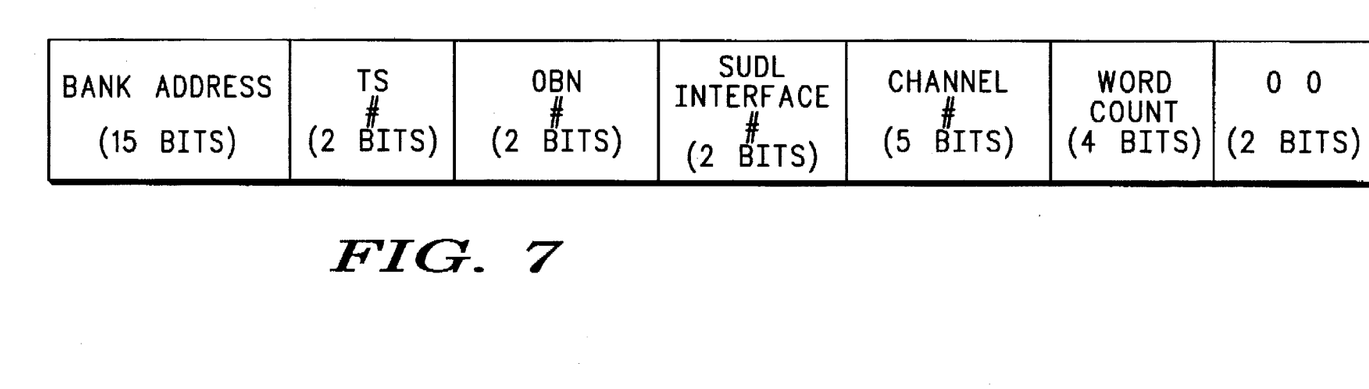
FIG. 7 shows a data format diagram of an output address formed by the routing controller.
Figure 8:
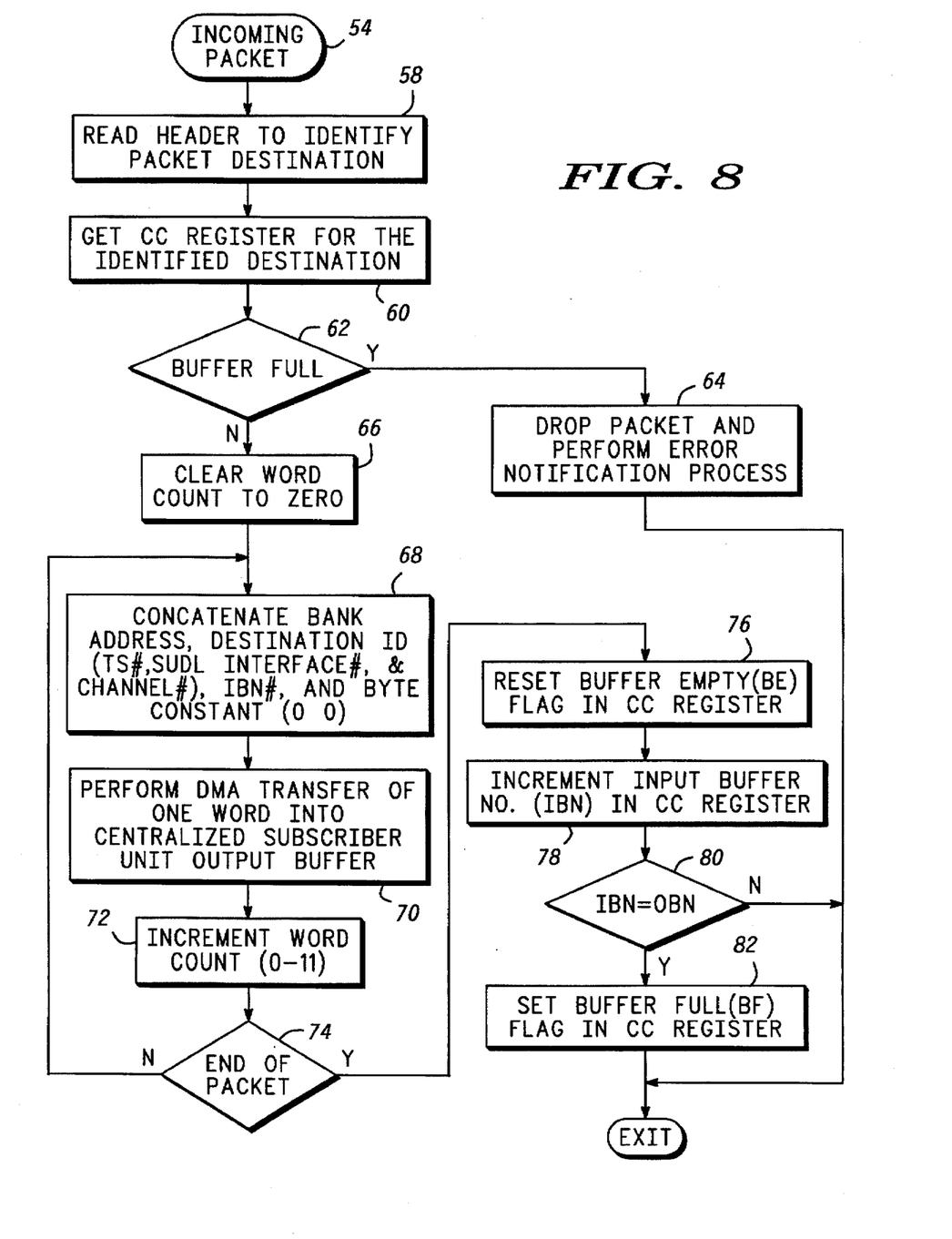
FIG. 8 shows a flow chart of an incoming packet process performed by the routing controller to direct packets into the centralized subscriber unit output buffer.
Figure 9:
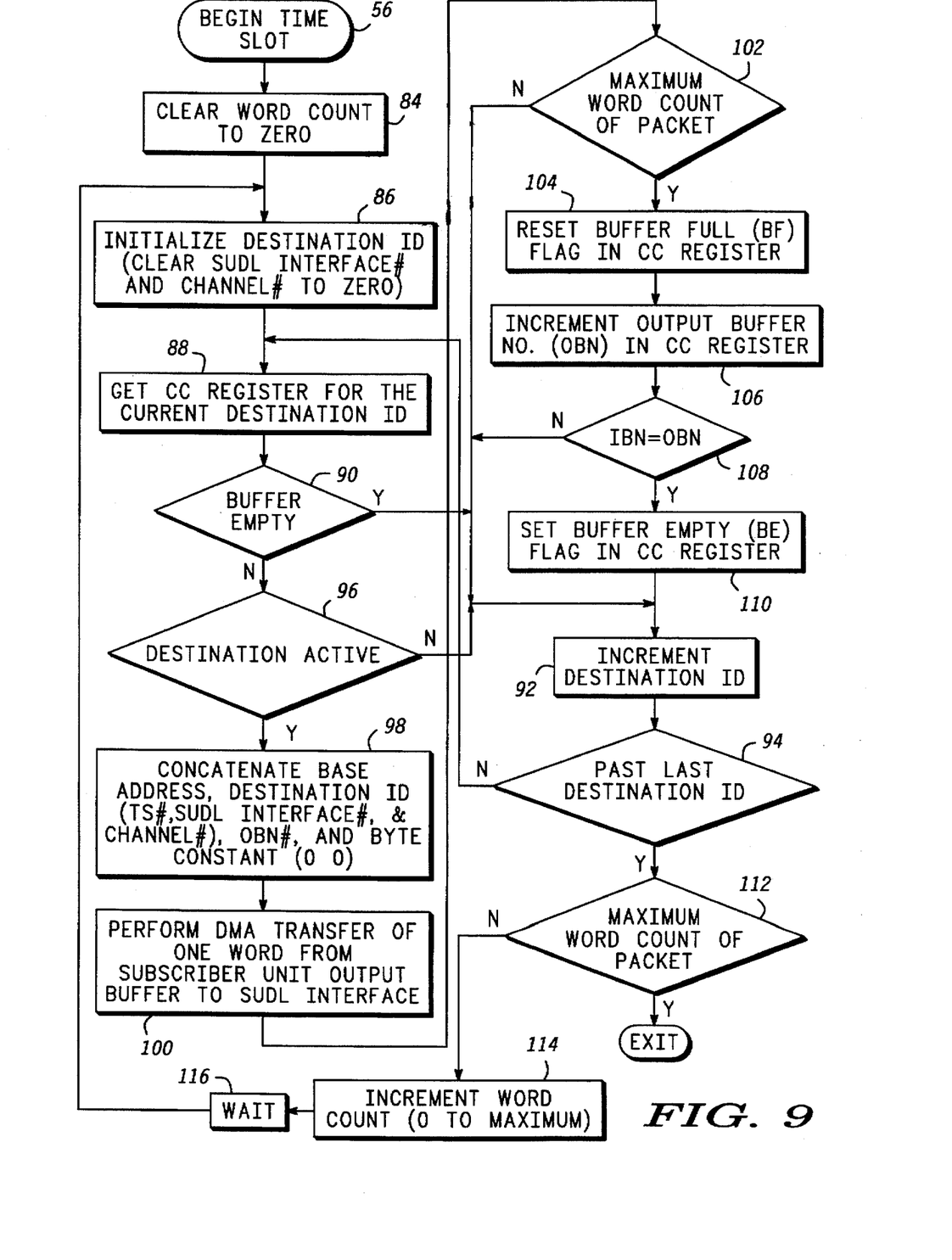
FIG. 9 shows a flow chart of a begin time slot process performed by the routing controller to direct packets out from the centralized subscriber unit output buffer.

FIG. 6 shows a data format diagram of an input address formed by routing controller 46, and FIG. 7 shows a data format diagram of an output address formed by routing controller 46. FIG. 8 shows a flow chart of an incoming packet process 54 performed by routing controller 46 to form the address illustrated in FIG. 6 and to direct packets into centralized subscriber unit output buffer 32. FIG. 9 shows a flow chart of a begin time slot process 56 performed by routing controller 46 to form the address illustrated in FIG. 7 and to direct packets out from centralized subscriber unit output buffer 32 to the appropriate SUDL output channel 48.

In the preferred embodiment, routing controller 46 is a state machine which performs the functions depicted in FIGS. 8 and 9. Those skilled in the art will appreciate that routing controller 46 may be implemented using a wide variety of well known hardware design techniques, including state machines, random logic, microcontrollers, microprocessors, and the like to accomplish these functions, and that the precise implementation is not critical to the present invention. Moreover, those skilled in the art will appreciate that nothing prevents routing controller 46 from performing other tasks and processes which may not relate to the operation of centralized subscriber unit output buffer 32.

Referring to FIGS. 6 and 8, incoming packet process 54 is performed when an incoming packet is received at antenna computer 28 (see FIG. 2) for switching to an SUDL output channel 48. Routing controller 46 may be informed of this event through an interrupt (not shown) or other signal provided by an interface 38, 40, or 42 (see FIG. 2).

Process 54 performs a task 58 in which a packet header is read to identify the packet destination. The destination includes identities for a specific time slot number (TS #), SUDL interface number and channel number. In the preferred embodiment, a call setup process or a hand-off process performed within network 10 (see FIG. 1) informs the packet's originating node of the destination and the originating node appends headers which convey the destination to payload data in forming packets included in a packet stream. As discussed above, the identification of a destination likewise serves as an identification of a four packet, FIFO buffer allocated within subscriber unit output buffer 32 (see FIG. 3).

After task 58, a task 60 gets or otherwise identifies the condensed control (CC) register which is associated with the identified destination. Next, a query task 62 determines whether the FIFO buffer is full. Task 62 may evaluate the buffer full (BF) flag of the destination's CC register in making its determination. If the buffer is full, an error condition has occurred and program control proceeds to a task 64. Task 64 causes the packet to be dropped and performs an error notification process. Task 64 may cause the incoming packet to be dropped by performing a DMA transfer of the packet to an otherwise unused portion of RAM 30. After task 64, program control exits process 54. No packet is written into subscriber unit output buffer 32.

When task 62 determines that the destination's FIFO buffer is not full, a task 66 clears a word count to a value of zero. The word count may be implemented in a 4 bit counter which increments through the values of 0-11 to identify the twelve words included in a packet.

After task 66, a task 68 forms the input address illustrated in FIG. 6. In particular, task 68 concatenates the bank address from bank address register 50 (see FIG. 4) with the destination ID from the packet header, the input buffer number (IBN) from the destination's CC register 52, and a byte indicator constant of 00. The destination ID is placed in time slot number (TS #), SUDL interface number, and channel number fields of the input address. The byte indicator constant indicates that accesses will be performed only on word boundaries, freeing routing controller 46 (see FIG. 2) from having to dedicate storage outside RAM 30 to keep track of sub-word addressing.

Those skilled in the art will appreciate that the concatenation performed by task 68 is a simple operation requiring no mathematical calculations, such as addition, shifting, bit mapping, or multiplication. Consequently, addresses may be formed quickly and with a minimal number of components. The use of a minimal number of components helps in implementing routing controller 46 within an ASIC, and the quick address formulation minimizes the time over which bus 34 (see FIG. 2) is dedicated to transferring the packet into subscriber unit output buffer 32.

After task 68, a task 70 performs a DMA transfer of one word of the incoming packet into centralized subscriber unit output buffer 32. The word is stored in buffer 32 at the address determined above in task 68. Next, a task 72 increments the word count to index the next word in the received packet, and a query task 74 determines whether the word count has progressed past the end of the packet. So long as the word count indexes a valid word of the packet, program control loops immediately back to task 68 to transfer the next packet word into centralized subscriber unit output buffer 32. The entire packet is quickly stored in buffer 32 through repeated performances of task 70 as the word counter increments from the value of zero through the value of eleven. Routing controller 46 refrains from performing other transfers relative to buffer 32 until the entire current incoming packet is stored in buffer 32.

When task 74 determines that the entire packet has been transferred, a task 76 resets the buffer empty (BE) flag for the current CC register 52 to indicate that this particular output channel's FIFO buffer contains at least one packet. Next, a task 78 increments the input buffer number (IBN) in the current CC register 52 to indicate where the next incoming packet for this output channel should be written.

After task 78, a query task 80 determines whether the input buffer number (IBN) now equals the output buffer number (OBN). If the IBN equals the OBN immediately after storing a packet in the FIFO buffer, the buffer has become full. A write to the next input buffer number would overwrite the packet which will next be retrieved from buffer 32 for this SUDL output channel 48. Consequently, when the IBN equals the OBN, a task 82 sets the buffer full (BF) flag for the current CC register 52. After task 82, program control exits incoming packet process 54. When the IBN does not equal the OBN, process 54 skips task 82 and immediately exits from task 80. After exiting, process 54 may immediately restart if another packet is awaiting transfer.

Accordingly, input packet process 54 activates when an incoming packet is detected and transfers the entire packet into an appropriate location within centralized subscriber unit output buffer 32 before exiting and before engaging in other input packet transfers relative to buffer 32. Process 54 consecutively transfers input packets into buffer 32. In other words, a first entire packet is transferred into buffer 32 before beginning to transfer a second packet, and then the second packet is transferred in its entirety. This consecutive transfer efficiently uses accesses to bus 34, particularly when packets destined for SUDL links 26 may be received with relatively random timing.

However, the consecutive transfer of incoming packets differs from an interleaved transfer which is used in transferring packets out from centralized subscriber unit output buffer 32. The interleaved transfer is discussed below in connection with FIG. 9.

Referring to FIGS. 7 and 9, begin time slot process 56 is initiated at the beginning of a time slot. As discussed above, the preferred embodiment of network 10 (see FIG. 1) incorporates a time-multiplexing technique in which frames are divided into four time slots. Synchronizing circuits outside of routing controller 46 track the timing and provide interrupts or other signals (not shown) that indicate the beginning of a particular time slot to routing controller 46. Those skilled in the art will appreciate that well-known hardware and/or software techniques may be implemented to permit process 56 to remain active while process 54 (see FIG. 8) is also active.

Upon initiating process 56, a task 84 clears a word count to a value of zero. The word count is used to keep track of individual words within packets. Next, a task 86 initializes a destination ID. This initialization may be accomplished by setting a time slot register to indicate the current time slot number (TS #) and by clearing a counter that will be used to keep track of individual channel numbers and SUDL interface numbers.

After task 86, a task 88 gets or otherwise identifies the condensed control (CC) register 52 (see FIG. 5) associated with the destination ID established above in task 86. Tasks 86 and 88 will be performed in a loop that eventually causes all possible destination IDs for the current time slot to be identified along with their corresponding CC registers 52.

After task 88, a query task 90 determines whether the buffer empty (BE) flag for the current CC register 52 indicates an empty buffer. If the current destination's buffer is empty, bus cycles for RAM 30 (see FIG. 2) need not be wasted transferring packets which are not in the buffer. Consequently, program control proceeds to a task 92 to increment the destination ID and index the next destination. Task 92 is performed in a loop that will eventually cause the destination ID to identify all possible destinations within the current time slot. In other words, the destination ID will eventually identify all channel numbers for all SUDL interfaces (see FIG. 3). After task 92, a query task 94 determines whether the destination ID has been incremented past the last destination ID for the current time slot. So long as additional destinations remain to be evaluated, program control loops back to task 88.

When task 90 determines that the FIFO buffer for the destination being currently evaluated is not empty, a query task 96 determines whether the current destination is active. Task 96 may be accomplished by reading a register (not shown) in routing controller 46 into which data may be written by switch controller 36 (see FIG. 2). This register may have specific bits dedicated to specific destinations, and task 96 may read or otherwise access the specific bit for the current destination. If this bit indicates that switch controller 36 has deactivated the current destination, bus cycles need not be wasted transferring data to SUDL interfaces, and program control proceeds to tasks 92 and 94 to identify another destination to evaluate.

So long as the current destination or output channel is active, a task 98 forms the output address illustrated in FIG. 7. In particular, task 98 concatenates the bank address from bank address register 50 (see FIG. 4) with the current destination ID, the output buffer number (OBN) from the current destination's CC register 52, and a byte indicator constant of 00. The destination ID is placed in time slot number (TS #), SUDL interface number, and channel number fields of the output address. The byte indicator constant forces accesses to be performed only on word boundaries. As discussed above in connection with task 68 (see FIG. 8), the concatenation performed by task 98 is a simple operation requiring no mathematical calculations, such as addition, shifting, bit mapping, or multiplication. Consequently, addresses may be formed quickly and with a minimal number of components.

After task 98, a task 100 performs a DMA transfer of one word from the centralized subscriber unit output buffer 32. SUDL interfaces 44 (see FIG. 2) are configured to identify when they are the target of the transfer, and the one word is written into a register for the appropriate output channel in the appropriate SUDL interface 44. The one word is read from buffer 32 at the address determined above in task 98.

Next, a query task 102 determines whether the word count indexes the maximum count of a packet. In the preferred embodiment, task 102 determines whether the word count is at a maximum count, where the maximum count is provided by the switch controller 36. So long as the word count does not index the maximum count of a packet, program control proceeds to task 92 to evaluate and possibly transfer a single packet word for another destination output channel. The word count does not change until all destinations have been evaluated.

When task 102 determines that the word count indexes the maximum count of a packet, a task 104 resets the buffer full (BF) flag for the current CC register 52 to indicate that this particular output channel's FIFO buffer is not full and has space for storage of at least one additional packet. Next, a task 106 increments the output buffer number (OBN) in the current CC register 52 to indicate from where in centralized subscriber unit output buffer 32 the next outgoing packet for this output channel should come.

After task 106, a query task 108 determines whether the input buffer number (IBN) now equals the output buffer number (OBN). If the IBN equals the OBN immediately after reading a packet from the FIFO buffer, the buffer has become empty. A read from the next output buffer number would produce invalid data which has probably already been transferred over the current SUDL link 26. Consequently, when the IBN equals the OBN, a task 110 sets the buffer empty (BE) flag for the current CC register 52. After task 110 and when task 108 determines that the IBN does not equal the OBN, program control proceeds to task 92 to evaluate and possibly transfer a single packet word for another destination output channel.

As discussed above, task 92 increments the destination ID, and task 94 determines whether this new destination ID is past or greater than the last destination for the current time slot. When task 94 determines that the destination ID has been incremented past the last destination ID for the current time slot, a query task 112 determines whether the word count is at the maximum count of a packet. Task 112 is similar to task 102, discussed above.

So long as the last destination has been evaluated but the maximum count has not been encountered, a task 114 increments the word count. After task 114, a task 116 may cause program control to wait before allowing program control to loop back to task 86. Task 86 will re-initialize the destination ID for another pass through all possible combinations of SUDL interface numbers and channel numbers for the current time slot and current word count. Task 116 may cause program control to wait until the last word written for the upcoming destination ID to a register associated with an output channel can be transferred to a shift register or otherwise transmitted and will not be overwritten. This wait task causes packet words to be fed to the output channels at the output channels' data transfer rate, allowing minimal buffering downstream from centralized subscriber unit output buffer 32. Process 56 remains in this loop until task 112 detects the last word of the last destination ID for the current time slot. Within this loop, the word count slowly increments from a value of zero through a programmable maximum count, a value of eleven in the preferred embodiment. Process 56 ends when task 112 determines that all packets have been transferred for the current time slot. However, process 56 restarts at the beginning of the next time slot.

Accordingly, process 56 transfers packets out from centralized subscriber unit output buffer 32 in an interleaved fashion. Words zero of all packets in non-empty FIFO buffers corresponding to all active channels in the current time slot are output sequentially, followed by words one, and so on through words eleven. This interleaving of packets flowing out from buffer 32 slows down the data transfer rate to match the data rate of each output channel 48. As a result, each of SUDL interfaces 44 (see FIG. 2) may include only minimal word buffering rather than entire packet buffering. This leads to implementation efficiencies within SUDL interfaces 44. Moreover, process 56 batches accesses of RAM 30 together so that no accesses are required for inactive channels or empty FIFO buffers. This minimizes bus accesses and maintains efficient use of bus 34.

In summary, the present invention provides an improved packet switching apparatus and method. A multiplicity of independent FIFO buffers are implemented in a centralized bulk RAM memory. Packets for outgoing communication links are consecutively written into appropriate FIFO buffers in the centralized memory to maintain a fast incoming data transfer rate for each packet and incoming channel. However, the packets are read out from appropriate FIFO buffers and routed to a multiplicity of output channels in an interleaved fashion which achieves a slow data transfer rate for any one output channel. The slower data transfer rate closely matches the data transfer rate of the output channel.

The present invention has been described above with reference to preferred embodiments. However, those skilled in the art will recognize that changes and modifications may be made in these preferred embodiments without departing from the scope of the present invention. For example, specific values and specific operations, such as incrementing and clearing have been described. However, those skilled in the art will appreciate that other values and other operations, such as decrementing and initializing to non-zero values may achieve substantially equivalent results. These and other changes and modifications which are obvious to those skilled in the art are intended to be included within the scope of the present invention.

What is claimed is:

1. A packet switching apparatus for switching a stream of received packets onward through a multiplicity of output channels comprising:

a central memory partially organized into a multiplicity of independent packet buffers;

a multiplicity of output channel drivers coupled to said central memory;

a routing controller, coupled to said central memory, for directing said received packets into said central memory and out from said central memory to said output channel drivers, said routing controller is configured so that said received packets are directed into said central memory consecutively and out from said central memory, interleaved together;

means for identifying each of said multiplicity of output channels;

means for determining whether each packet buffer for each of said multiplicity of identified output channels is empty; and means for transferring only data from ones of said independent packet buffers which are not empty over a shared bus.

2. A packet switching apparatus as claimed in claim 1 wherein:

said routing controller is configured so that an entire first one of said received packets is directed into a first one of said independent packet buffers before a second one of said received packets is directed into a second one of said independent packet buffers; and said routing controller directs said first and second received packets out from said first and second independent packet buffers with portions of said first and second received packets being interleaved together.

3. A packet switching apparatus as claimed in claim 1 additionally comprising a switch controller coupled to said central memory, said switch controller being configured to refrain from accessing said multiplicity of independent packet buffers.

4. A packet switching apparatus as claimed in claim 3 wherein said routing controller, said switch controller, said central memory, and output channel drivers are mutually configured so that said received packets are directed into said independent packet buffers and out from said independent packet buffers using direct memory access (DMA).

5. A packet switching apparatus as claimed in claim 1 wherein said routing controller comprises a multiplicity of condensed control registers configured so that each of said multiplicity of condensed control registers is associated with a corresponding output channel.

6. A packet switching apparatus as claimed in claim 5 wherein each condensed control register includes an input buffer number field and an output buffer number field.

7. A packet switching apparatus as claimed in claim 5 wherein each packet has more than $2^N$ bits of data, where N is an integer number, and said each condensed control register stores fewer than N bits of data.

8. A packet switching apparatus as claimed in claim 1 wherein:

each of said independent packet buffers has a length equal to $2^N$ words, where N is an integer number; and each of said received packets has a length less than or equal to $2^N$ words.

9. A packet switching apparatus as claimed in claim 1 wherein:

said packet switching apparatus additionally comprises a satellite configured to orbit the earth; and said central memory, said output channel drivers, and said routing controller reside in said satellite.

10. A method for switching a stream of input packets onward through a multiplicity of output channels, said method comprising the steps of:

organizing a control memory into a multiplicity of independent packet buffers, wherein each packet buffer is associated with one of said multiplicity of output channels;

for each of said input packets in said stream of input packets, identifying one of said packet buffers in response to data conveyed by a packet header and storing said input packets in said identified packet buffer;

for each input packet in said stream of input packets, transferring said input packets from a selected one of said packet buffers to one of said multiplicity of output channels that corresponds to said selected one of said packet buffers;

directing said input packets into said central memory consecutively;

directing said input packets out from said central memory in an interleaved fashion;

identifying each said multiplicity of output channels;

determining whether said each packet buffer for each of said multiplicity of identified output channels is empty; and transferring only data from ones of said independent packet buffers which are not empty over a shared bus.

11. A method as claimed in claim 10 additionally comprising the steps of:

forming addresses for said independent packet buffers at a routing controller; and implementing a multiplicity of condensed control registers in said routing controller, wherein each condensed control register is associated with a corresponding output channel.

12. A method as claimed in claim 11 additionally comprising the step of configuring each of said multiplicity of condensed control registers to include an input buffer number field and an output buffer number field.

13. A method as claimed in claim 10 additionally comprising the steps of:

arranging each of said independent packet buffers to have a length equal to $2^N$ words, where N is an integer number; and configuring each of said input packets to have a length less than $2^N$ words.

14. A method as claimed in claim 10 wherein said input packets are transferred over the shared bus from said central memory to said output channel driver, and said method additionally comprises the steps of:

for each of said multiplicity of output channels, determining whether said output channel is active; and transferring only data from ones of said independent packet buffers which are associated with active output channels over said shared bus.

* * * * *